(12) United States Patent
Hori et al.

(10) Patent No.: US 12,168,591 B2
(45) Date of Patent: Dec. 17, 2024

(54) VERTICAL TRANSPORTATION MACHINE GUIDANCE DEVICE AND VERTICAL TRANSPORTATION MACHINE GUIDANCE METHOD

(71) Applicant: Mitsubishi Electric Corporation, Tokyo (JP)

(72) Inventors: Atsushi Hori, Tokyo (JP); Kenta Kuze, Tokyo (JP); Mitsutoshi Iio, Tokyo (JP); Wei Wu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 141 days.

(21) Appl. No.: 17/778,011

(22) PCT Filed: Jan. 30, 2020

(86) PCT No.: PCT/JP2020/003423
§ 371 (c)(1),
(2) Date: May 19, 2022

(87) PCT Pub. No.: WO2021/152771
PCT Pub. Date: Aug. 5, 2021

(65) Prior Publication Data
US 2022/0411226 A1    Dec. 29, 2022

(51) Int. Cl.
*B66B 3/00* (2006.01)
*G01C 21/20* (2006.01)
(Continued)

(52) U.S. Cl.
CPC ............ *B66B 3/006* (2013.01); *G01C 21/206* (2013.01); *G08B 5/36* (2013.01); *G08B 7/066* (2013.01)

(58) Field of Classification Search
CPC ........... B66B 1/00; B66B 1/2458; B66B 1/14; B66B 1/18; B66B 1/468; B66B 3/00;
(Continued)

(56) References Cited

U.S. PATENT DOCUMENTS 9,505,586 B2 * 11/2016 Wu ....................... B66B 5/0012
10,329,118 B2    6/2019 Pasini et al.
(Continued)

FOREIGN PATENT DOCUMENTS

| CN | 103459288 A | * | 12/2013 | ............. B66B 1/468 |
| CN | 110451369 A | * | 11/2019 | ............. B66B 1/468 |

(Continued)

OTHER PUBLICATIONS

International Search Report mailed on Apr. 7, 2020, received for PCT Application PCT/JP2020/003423, Filed on Jan. 30, 2020, 2 pages.
(Continued)

*Primary Examiner* — Stephen R Burgdorf
(74) *Attorney, Agent, or Firm* — XSENSUS LLP (57) ABSTRACT

There is provided an elevator guidance device 40 including an identification information acquisition unit 41 configured to acquire identification information for a user heading for an elevator hall, a selected elevator information acquisition unit 42 configured to acquire information on a selected elevator selected from a plurality of elevators as an elevator for the user identified to take, and a guidance indication unit 43 configured to indicate, in an indication mode associated with the user, a leading guidance sign on a route starting from a leading start position, at which leading of the user identified is started, to a landing entrance of the selected elevator, the leading guidance sign leading the user to the landing entrance of the selected elevator.

14 Claims, 5 Drawing Sheets

(51) Int. Cl.
 *G08B 5/36* (2006.01)
 *G08B 7/06* (2006.01)
(58) Field of Classification Search
 CPC ....... B66B 3/002; B66B 3/006; B66B 5/0057; G01C 21/206; G06F 30/00; G07C 9/00; G08B 5/36; G08B 7/066
 USPC .......................................................... 340/944
 See application file for complete search history.

(56) References Cited

U.S. PATENT DOCUMENTS

| | | | |
|---|---|---|---|
| 2008/0010013 A1* | 1/2008 | Rusanen | B66B 1/34 |
| | | | 701/408 |
| 2008/0142166 A1 | 6/2008 | Carson et al. | |
| 2014/0054116 A1 | 2/2014 | Wu | |
| 2016/0084660 A1* | 3/2016 | Salmikuukka | G01C 21/206 |
| | | | 701/522 |
| 2017/0122744 A1* | 5/2017 | Long | G01C 21/206 |
| 2017/0267487 A1* | 9/2017 | Pasini | B66B 3/006 |
| 2018/0053504 A1* | 2/2018 | Wang | H04W 4/33 |
| 2019/0322483 A1* | 10/2019 | Gireddy | B66B 1/3461 |
| 2019/0345001 A1* | 11/2019 | Chen | B66B 1/468 |
| 2020/0309557 A1* | 10/2020 | Efland | G06V 20/20 |
| 2021/0214186 A1* | 7/2021 | Hiltunen | B66B 1/468 |

FOREIGN PATENT DOCUMENTS

| | | | | |
|---|---|---|---|---|
| JP | 1-147367 U1 | 10/1989 | | |
| JP | 6-16350 A | 1/1994 | | |
| JP | 2007-535652 A | 12/2007 | | |
| JP | 2010-70382 A | 4/2010 | | |
| JP | 2011-126690 A | 6/2011 | | |
| JP | 2013-67489 A | 4/2013 | | |
| JP | 2015-13695 A | 1/2015 | | |
| JP | 2015218015 A * | 12/2015 | ............... | B66B 3/00 |
| JP | 2016-193771 A | 11/2016 | | |
| JP | 6249409 B2 | 12/2017 | | |
| WO | 2012/131769 A1 | 10/2012 | | |
| WO | 2018/145909 A1 | 8/2018 | | |

OTHER PUBLICATIONS

Japanese Office Action issued Oct. 18, 2022 in corresponding Japanese Patent Application No. 2021-574364 (with machine-generated English translation), 10 pages.

Office Action issued on Sep. 8, 2022, in corresponding Indian patent Application No. 202247026999, 5 pages.

Chinese Office Action dated Nov. 13, 2023, issued in corresponding Chinese patent application No. 202080093246.1, 18 pages.

* cited by examiner

FIG.5

VERTICAL TRANSPORTATION MACHINE GUIDANCE DEVICE AND VERTICAL TRANSPORTATION MACHINE GUIDANCE METHOD

CROSS-REFERENCE TO RELATED APPLICATION

The present application is based on PCT filing PCT/JP2020/003423, filed Jan. 30, 2020, the entire contents of which is incorporated herein by reference.

FIELD

The present disclosure relates to a vertical transportation machine guidance device and a vertical transportation machine guidance method that guide each user heading for a vertical transportation machine hall to the landing entrance of a vertical transportation machine selected for the user.

BACKGROUND

Conventionally, there has been a known device that receives an input for a destination floor performed by a user through an operating panel provided in an elevator hall, that selects an elevator suitable for the user to take, and that indicates the Elevator No. of the elevator selected (hereinafter referred to as "selected elevator") on an indication unit of the operating panel. Patent Literature 1 proposes a technique where an arrow is indicated under the feet of a user who performs an input for a destination floor through an operating panel. The arrow connects the operating panel and a position where the user is to wait for the selected elevator. The arrow is indicated by a design designated for each group heading for the same destination floor. Patent Literature 2 and 3 propose a technique where a security gate is provided in front of the elevator hall, registration of a destination floor performed by a user is received at the entrance of the security gate, and guidance information of the selected elevator is indicated on an indication unit installed at the exit of the security gate.

CITATION LIST

Patent Literature

[PTL 1] JP 2015-218015 A
[PTL 2] JP 2011-126690 A
[PTL 3] JP 2013-67489 A

SUMMARY

Technical Problem

However, in the method described in the above-mentioned Patent Literature 1, where the arrow is indicated by a design designated for a group heading for the same destination floor to guide the user from the operating panel to the selected elevator, in the case where users are concentrated together in the elevator hall and a large number of arrows are simultaneously indicated, there may be a case where the user cannot easily recognize which arrow is the indication indicated for himself/herself. For example, in the case where a plurality of users heading for different destination floors constantly input destination floors through the operating panel one after another, a plurality of arrows are indicated with close timing and hence, it is difficult to distinguish which arrow is indicated for which user.

Further, in the method described in Patent Literatures 2 and 3, where the user is guided to the selected elevator only by the indication indicated on the indication unit installed in the security gate, the user may fail to notice the indication, or even in the case where the user does not fail to notice the indication without missing the indication, thereafter, during the movement to the elevator hall, the user may forget the content of the indication which the user saw. Therefore, there may be a case where a desired effect cannot be obtained.

In view of the above, it is an object of the present disclosure to provide a vertical transportation machine guidance device and a vertical transportation machine guidance method that can guide each user heading for a vertical transportation machine hall to the landing entrance of a vertical transportation machine selected for the user with a mode that can be easily understood by the user.

Solution to Problem

A vertical transportation machine guidance device according to the present disclosure includes: identification information acquisition means to acquire identification information for a user heading for a vertical transportation machine hall; selected vertical transportation machine information acquisition means to acquire information on a selected vertical transportation machine selected from a plurality of vertical transportation machines as a vertical transportation machine for the user identified to take; and guidance indication means to indicate, in an indication mode associated with the user, a leading guidance sign on a route starting from a leading start position, at which leading of the user identified is started, to a landing entrance of the selected vertical transportation machine, the leading guidance sign leading the user to the landing entrance of the selected vertical transportation machine.

A vertical transportation machine guidance method according to the present disclosure includes: acquiring identification information for a user heading for a vertical transportation machine hall; acquiring information on a selected vertical transportation machine selected from a plurality of vertical transportation machines as a vertical transportation machine for the user identified to take, and indicating, in an indication mode associated with the user, a leading guidance sign on a route starting from a leading start position, at which leading of the user identified is started, to a landing entrance of the selected vertical transportation machine, the leading guidance sign leading the user to the landing entrance of the selected vertical transportation machine.

Advantageous Effects of Invention

With the vertical transportation machine guidance device and the vertical transportation machine guidance method according to the present disclosure, it is possible to guide each user heading for the vertical transportation machine hall to the landing entrance of the vertical transportation machine selected for the user in a mode easily understood by the user.

DESCRIPTION OF EMBODIMENTS

First Embodiment

Figure 1:
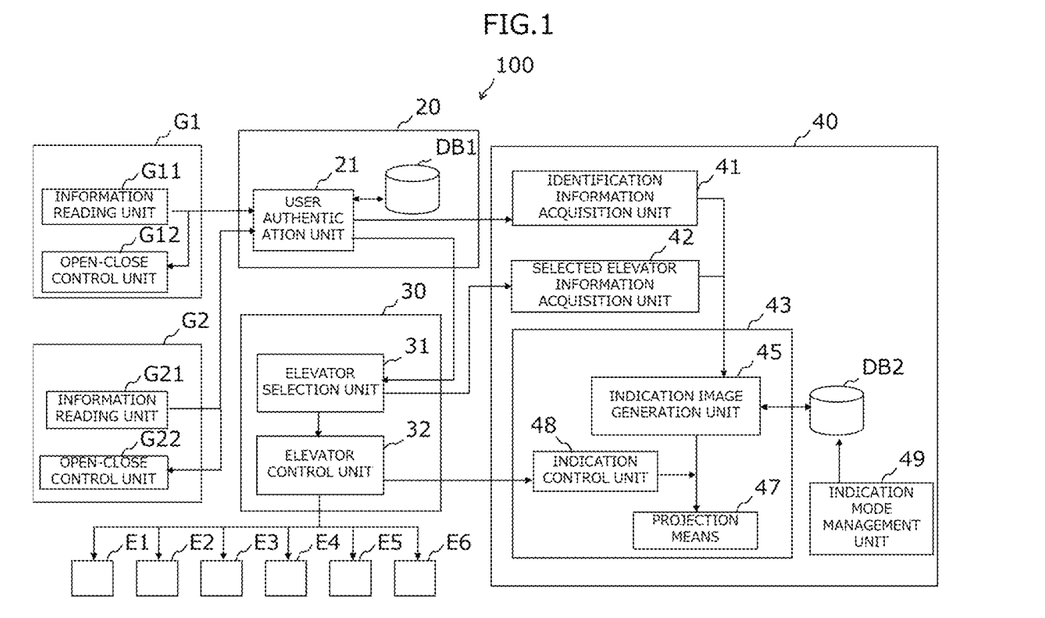
FIG. 1 is a schematic block diagram of an elevator management system according to a first embodiment.

Hereinafter, a first embodiment will be described. FIG. 1 is a view showing the schematic configuration of an elevator management system 100 according to the first embodiment. The elevator management system 100 includes a plurality of security gates G1, G2, an access management device 20, an elevator management device 30, and an elevator guidance device 40.

The security gates G1, G2 are gates provided at the entrance and exit of an elevator hall to allow only users having the access authority to pass therethrough. The security gate G1 includes an information reading unit G11 and an open-close control unit G12. The security gate G2 includes an information reading unit G21 and an open-close control unit 22. Each of the information reading units G11, G21 reads information, by which a user is identified, from a magnetic card, an IC card, tag equipment or the like carried by the user, and transmits the information to a user authentication unit 21 of the access management device 20. The user authentication unit 21 that receives such identification information returns the authentication result of whether the user identified by the identification information has the access authority. The open-close control unit G12, G22 receives the authentication result from the user authentication unit 21, and controls opening and closing of a gate according to the authentication result to allow only users having the access authority to pass therethrough.

The access management device 20 manages access of a user to the elevator hall, which is an area beyond the security gates G1, G2. The access management device 20 includes a first database DB1 and the user authentication unit 21. In the first database DB1, identification information for each user is registered in association with the access authority for the user and information on the destination floor of an elevator for the user. The user authentication unit 21 receives identification information for a user from the information reading unit G11 (or G21) of the security gate G1 (or G2). The user authentication unit 21 authenticates whether the user identified by such identification information has the access authority based on information registered in the first database DB1. Then, the user authentication unit 21 returns the authentication result to the security gate G11 (or G21). In the case where the user has the access authority, the user authentication unit 21 transmits the identification information for the user and identification information for the security gate G1 (or G2), by which the identification information for the user is read, to an identification information acquisition unit 41 of the elevator guidance device 40. The user authentication unit 21 also transmits information on the destination floor, which is associated with the identification information for the user, registered in the first database DB1 to an elevator selection unit 31 of the elevator management device 30.

The elevator management device 30 manages the operation of elevators E1 to E6 installed in a building, and includes the elevator selection unit 31 and an elevator control unit 32. The elevator selection unit 31 receives the information on the destination floor from the user authentication unit 21 and, based on the information on the destination floor and operating conditions of the respective elevators E1 to E6, selects an elevator for the user to take to the destination floor from the elevators E1 to E6. This selection is performed, for example, based on information on positions or speeds of cars of the respective elevators E1 to E6, status of users in the cars, the stop quantity of floors until the destination floor, and the like. Further, the elevator selection unit 31 outputs the elevator selection result for each user to the elevator control unit 32, and also transmits the elevator selection result to a selected elevator information acquisition unit 42 which will be described later. The elevator control unit 32 controls the operations of the respective elevators E1 to E6 according to the elevator selection result transmitted from the elevator selection unit 31.

The elevator guidance device 40 guides a user passing through the security gate G1 (or G2) to the landing entrance of an elevator selected by the elevator selection unit 31 (hereinafter referred to as "selected elevator"). The elevator guidance device 40 includes the identification information acquisition unit 41, the selected elevator information acquisition unit 42, a guidance indication unit 43, an indication mode management unit 49, and a second database DB2.

The identification information acquisition unit 41 acquires identification information for a user heading for the elevator hall. More specifically, the identification information acquisition unit 41 acquires, from the user authentication unit 21, identification information for the user and identification information for the security gate G1 (or G2) by which the identification information for the user is read. The selected elevator information acquisition unit 42 acquires information on the selected elevator selected from a plurality of elevators as an elevator for the user identified to take. In other words, the selected elevator information acquisition unit 42 acquires, from the elevator selection unit 31, the elevator selection result for the user, that is, information on the selected elevator. The information acquired by the identification information acquisition unit 41 and the information acquired by the selected elevator information acquisition unit 42 are used in processing performed by an indication image generation unit 45 of the guidance indication unit 43.

On a route starting from a leading start position, at which leading of the identified user starts, to the landing entrance of the selected elevator, the guidance indication unit 43 indicates, in an indication mode associated with the user, a leading guidance sign that leads the user to the landing entrance of the selected elevator. More specifically, the guidance indication unit 43 indicates a leading guidance sign that leads the user passing through the security gate G1 (or G2) to the landing entrance of the selected elevator.

The guidance indication unit 43 includes the indication image generation unit 45, a projection means 47, and an indication control unit 48. The indication image generation unit 45 generates an image of a leading guidance sign. The projection means 47 projects the generated image to a target indication range on the floor surface or the like of the elevator hall. The indication control unit 48 controls the indication of the leading guidance sign projected by the projection means 47.

The leading guidance sign includes a route guidance sign and a selected elevator guidance sign, for example. The route guidance sign indicates a route starting from the exit of the security gate G1 (or G2) through which the user passes to the landing entrance of the selected elevator. The route guidance sign is achieved by an image of an arrow or the like. The selected elevator guidance sign is an indication indicating that the selected elevator is selected as the elevator for the target user to take, the selected elevator guidance sign being indicated on the door surface of the selected elevator, on the floor surface in front of the landing entrance, or in a space in front of the door. In the first embodiment, the route guidance sign is described as an example of the leading guidance sign.

In the second database DB2, identification information for each user is registered in association with the indication mode of a leading guidance sign for the user. The indication mode of the leading guidance sign is automatically or manually set in advance for each user. The indication mode is defined by design elements, such as shape, color, pattern, size, or the like. For each design element, a plurality of candidates that can be selected are prepared in advance so as to allow a change in design when necessary. In the second database DB2, identification information for each of the security gates G1, G2 is also registered in association with position information of the exit of each of the security gates G1, G2. The position of the exit of each of the security gates G1, G2 corresponds to the leading start position of the present disclosure.

The indication mode management unit 49 manages the registration of indication modes in the second database DB2. The indication mode management unit 49 has a function of receiving instructions from a user to register the indication mode, and of registering the indication mode in the second database DB2 in association with the identification information for the user. The indication mode management unit 49 also has a function of receiving a change instruction signal that instructs a change in the indication mode associated with the user, and of changing the indication mode associated with the user. The indication mode management unit 49 corresponds to an indication mode change means of the present disclosure.

The indication image generation unit 45 generates an image of the route guidance sign by using identification information for the user acquired by the identification information acquisition unit 41, identification information for the security gate G1 (or G2) through which the user passes, and information on the selected elevator acquired by the selected elevator information acquisition unit 42. Specifically, first, the indication image generation unit 45 acquires, with reference to the second database DB2, information on the indication mode registered in association with identification information for the user and position information of the exit of the security gate G1 (or G2), registered in association with identification information for the security gate G1 (or G2). Then, based on such acquired information, the indication image generation unit 45 generates an image adopting the indication mode and indicating the route starting from the exit of the security gate G1 (or G2) to the landing entrance of the selected elevator. By projecting the generated image in the target indication range on the floor surface or the like of the elevator hall by the projection means 47, the route guidance sign is indicated for the user.

Figure 2:
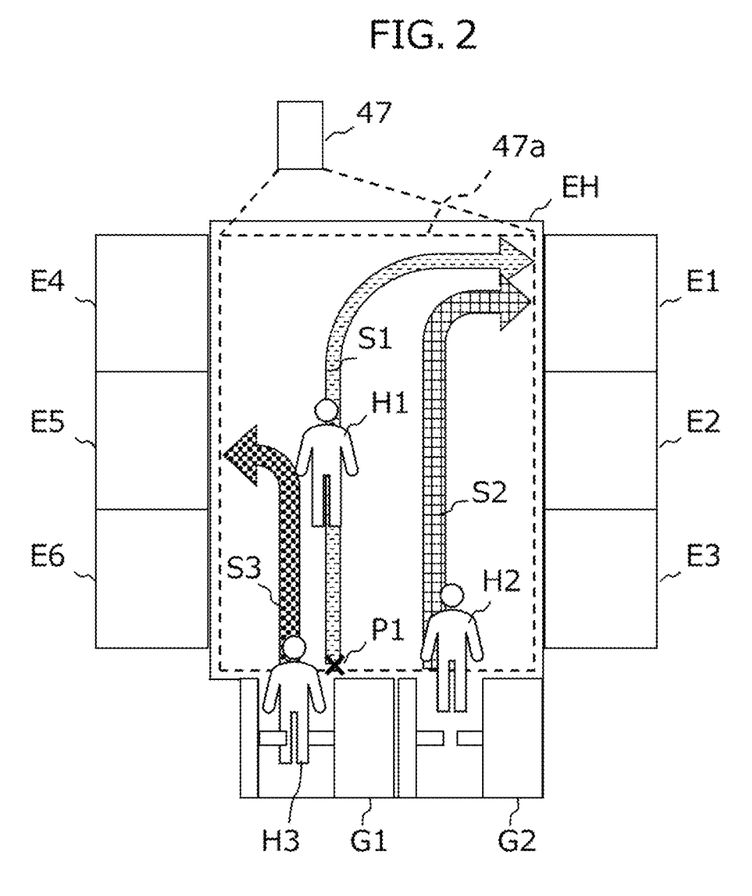
FIG. 2 is a view showing an example of indication of route guidance signs generated by an elevator guidance device.

FIG. 2 is a view showing an example where route guidance signs S1 to S3 are indicated for a plurality of users H1 to H3 respectively, the route guidance signs S1 to S3 adopting indication modes associated with respective users. FIG. 2 shows the case where the indication modes respectively associated with the users H1 to H3 are arrow shapes which differ in size and pattern, the elevator E1 is selected for the user H1 passing through the security gate G1, the elevator E1 is selected for the user H2 passing through the security gate G2, and the elevator E5 is selected for the user H3 passing through the security gate G1. A route guidance sign S1 adopting the indication mode associated with the user H1 is projected in a target indication range 47*a* on the floor surface of an elevator hall EH by the projection means 47, thus being indicated under the feet of the user H1. The route guidance sign S1 shows the route starting from a position P1 of the exit of the security gate G1 to the landing entrance of the elevator E1. In the same manner, the route guidance sign S2 adopting the indication mode associated with the user H2 is indicated under the feet of the user H2. The route guidance sign S3 adopting the indication mode associated with the user H3 is indicated under the feet of the user H3.

In the case of indicating a leading guidance sign for a new user whose indication mode is not registered in the second database DB2, a desired indication mode is registered in the second database DB2 in association with such a new user by the guidance indication unit 43, and the guidance indication unit 43 indicates the leading guidance sign by adopting such an indication mode. For example, some candidates for an indication mode are prepared in advance and, of such candidates, an indication mode is adopted that does not overlap with an indication mode in use for indicating the leading guidance sign for another user. Further, the guidance indication unit 43 notifies that a specific indication mode is associated with the new user as the indication mode used in indicating the leading guidance sign for the new user. This notification may be made by causing an indication image generated by the indication image generation unit 45 to include the content of the notification, for example.

When indication modes that are associated with two or more identified users overlap with each other, the guidance indication unit 43 indicates the route guidance sign for at least a portion of such users in an indication mode different from the overlapping indication mode. More specifically, in the case where the guidance indication unit 43 indicates a plurality of leading guidance signs due to the presence of a plurality of users heading for the elevator hall, the guidance indication unit 43 determines whether indication modes that are associated with these users overlap with each other. When the guidance indication unit 43 determines that the indication modes overlap with each other, the guidance indication unit 43 eliminates the overlapping state by changing the indication mode for at least a portion of such users. In determining whether indication modes overlap with each other, it is preferable to consider, as overlapping state, not only the case where a plurality of indication modes completely match with each other, but also the case where a predetermined number or more of design elements are used in common among the plurality of indication modes, thus preventing a user from immediately recognizing a sign indicated for himself/herself. In changing the indication mode due to overlapping state, the guidance indication unit 43 may indicate an indication to attract the user's attention with respect to the leading guidance sign being indicated in an indication mode different from the indication mode associated with the user. Such an indication to attract the user's attention may be indicated by causing an indication image, generated by the indication image generation unit 45, to include an indication to attract the user's attention, for example. Further, a configuration may be adopted where, before an indication is started in a different indication mode, for example, by making use of a communication means (not shown in the drawing) capable of communicating with a mobile terminal of the user, the user is asked if the indication mode can be changed.

The indication control unit 48 controls the indication of the leading guidance sign projected by the projection means 47. Specifically, when each user passes through the security gate G1 (or G2), the indication control unit 48 causes the projection means 47 to start the indication of the leading guidance sign for the user. Then, the indication control unit 48 causes the projection means to complete the indication of the leading guidance sign at a timing of reception of an arrival notification of the selected elevator from the elevator control unit 32, which controls the operations of the elevators E1 to E6.

Figure 3:
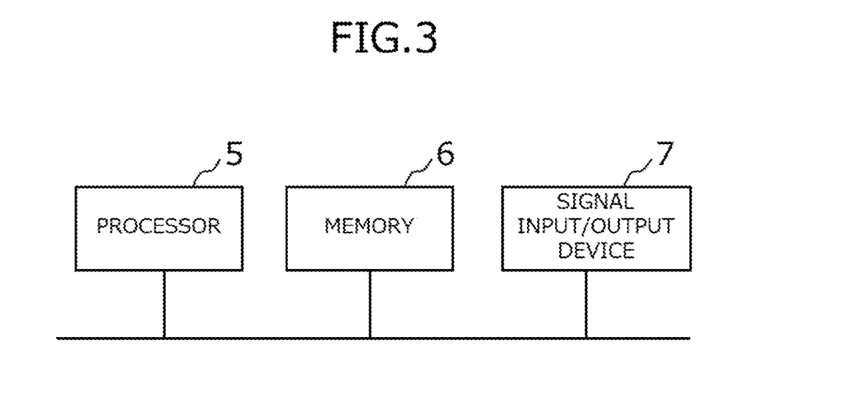
FIG. 3 is a block diagram of hardware of the elevator guidance device.

Respective components of the elevator guidance device 40 other than the projection means 47 are formed by a computer shown in FIG. 3 including a processor 5, a memory 6, and a signal input/output unit 7. The functions of the identification information acquisition unit 41, the selected elevator information acquisition unit 42, the indication image generation unit 45, and the indication control unit 48 are achieved by this computer. In other words, the memory 6 of the computer stores a program (elevator guidance program) for achieving the functions of the identification information acquisition unit 41, the selected elevator information acquisition unit 42, the indication image generation unit 45 and the indication control unit 48. The memory 6 also stores registration information of the indication modes for respective users managed by the second database DB2. Based on the program stored in the memory 6, the processor 5 performs arithmetic operation processing relating to the function of the elevator guidance device 40.

Figure 4:
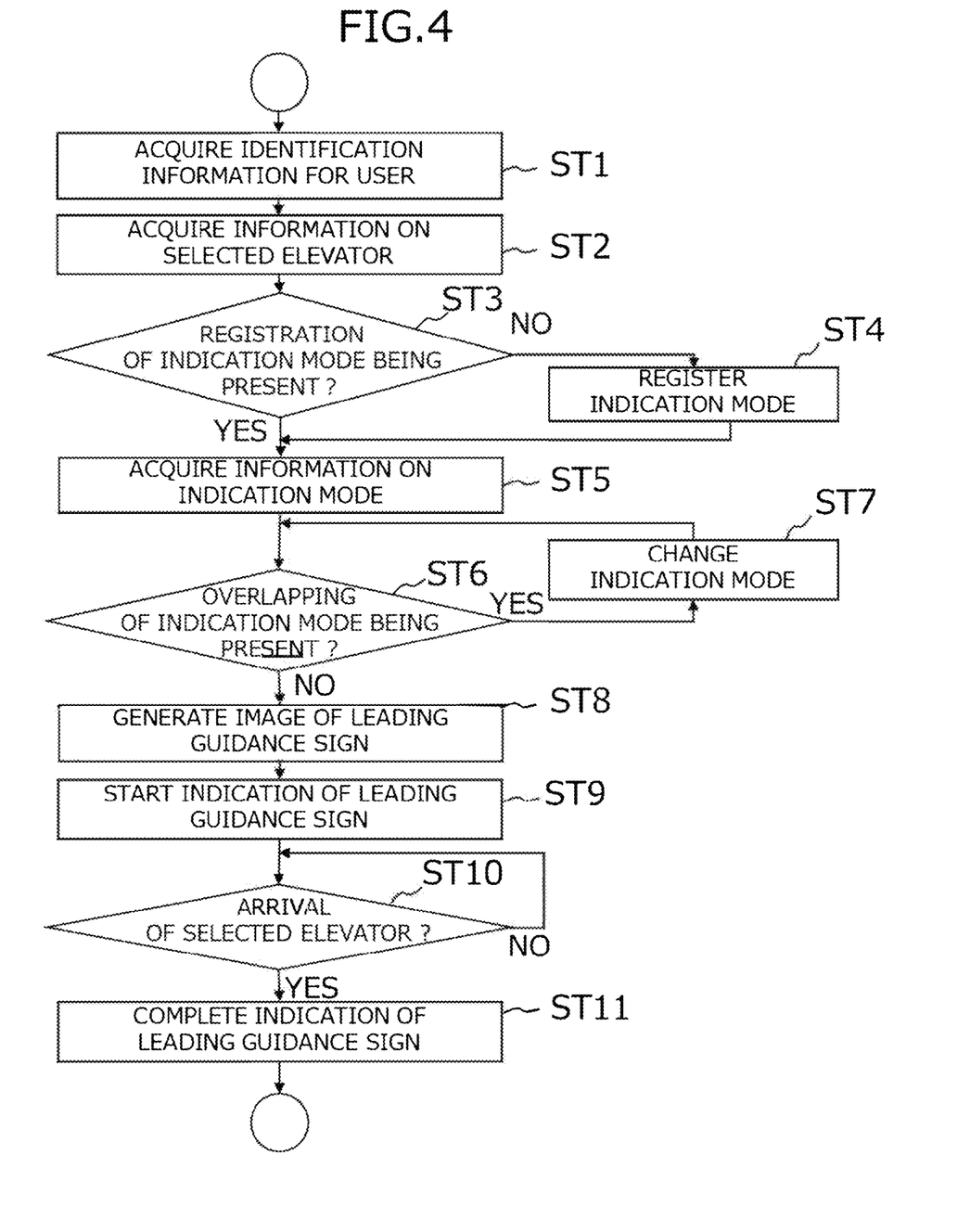
FIG. 4 is a flowchart showing the flow of processing performed by the elevator guidance device.

Next, the flow of processing performed by the elevator guidance device 40 will be described with reference to a flowchart shown in FIG. 4. In the first embodiment, assume the case where a user having the access authority passes through the security gate G1 (or G2) and heads for the elevator hall. It is assumed that, before the following processing in step ST1 performed by the elevator guidance device 40 is started, the information reading unit G11 (or G21) of the security gate G1 (or G2) reads identification information for the user, and the user authentication unit 21 authenticates the user's access authority based on such identification information. Further, the description will be made assuming that, before the following processing in step ST2 is started, the elevator selection unit 31 receives information on the destination floor for the user from the user authentication unit 21, and selects an elevator for the user to take based on the information on the destination floor and operating conditions of the respective elevators E1 to E6.

First, the identification information acquisition unit 41 acquires, from the user authentication unit 21, identification information for the user and identification information for the security gate G1 (or G2) by which the identification information for the user is read (step ST1). And the selected elevator information acquisition unit 42 acquires, from the elevator selection unit 31, information on the selected elevator selected for the user (step ST2). Next, the indication image generation unit 45 judges whether the indication mode associated with the identification information for the user acquired in step ST1 is registered in the second database DB2 (step ST3). When the indication mode associated with the identification information for the user is not registered (step ST3, NO), a desired indication mode is associated with the identification information for the user and registered in the second database DB2 (step ST4).

Then, the indication image generation unit 45 acquires, from the second database DB2, information on the indication mode registered in the second database DB2 in association with the identification information for the user (step ST5), and determines whether the acquired indication mode overlaps with an indication mode in use for indicating a leading guidance sign for another user (step ST6). When the acquired indication mode overlaps with the indication mode in use (step ST6, YES), the indication mode is changed to eliminate overlapping (step ST7).

Next, the indication image generation unit 45 generates an image of the leading guidance sign adopting the indication mode determined in the processing up to step ST7 (step ST8). For example, the indication image generation unit 45 acquires, from the second database DB2, position information of the exit of the security gate G1 (or G2) registered in association with the identification information for the security gate G1 (or G2) acquired in step ST1, and generates an image of a route guidance sign indicating the route starting from the position of the exit to the landing entrance of the selected elevator acquired in step ST2.

Next, the indication control unit 48 causes the image of the leading guidance sign generated in step ST8 to be projected on the floor surface or the like of the elevator hall by controlling the motion of the projection means 47, so that the indication of the leading guidance sign for the user is started (step ST9). Thereafter, upon reception of the arrival of the selected elevator (step ST10, YES), such an indication is completed, and a series of processing is completed.

As has been described above, the elevator guidance device 40 indicates, in an indication mode associated with each user, a leading guidance sign on the route starting from the exit of the security gate through which the user passes to the selected elevator selected as the elevator for the user to take, the leading guidance sign leading the user to the landing entrance of the selected elevator. Therefore, it is possible to guide each user to the landing entrance of the elevator selected for the user in a mode that can be easily understood by the user. Accordingly, even in the case where a plurality of leading guidance signs are simultaneously indicated due to the presence of a plurality of users heading for the elevator hall, each user can find the selected elevator guidance sign adopting the indication mode associated with himself/herself and can arrive at the selected elevator without getting lost by following the sign.

In the above-mentioned first embodiment, the description has been made for the case where the position of the exit of the security gate is taken as the leading start position of the present disclosure, and a leading guidance sign is indicated on the route starting from the position of the exit of the security gate to the landing entrance of the selected elevator. However, the configuration is not limited to such a configuration. The leading start position may be a fixed position set in advance at the entrance and exit of the elevator hall. Alternatively, for example, a configuration may be adopted where the current position of the user is identified from an image obtained by recording the entrance and exit of the elevator hall in real time, and a leading guidance sign is indicated by using the identified position of the user as a leading start position.

FIG. 2 of the above-mentioned first embodiment shows, as an example, the case where all of the route guidance signs S1 to S3 have an arrow shape. However, in the same manner as other design elements, other suitable design may be adopted for the shape of a route guidance sign. For example, a shape may be adopted where footprints are arranged along the route.

Second Embodiment

Hereinafter, a second embodiment will be described. The second embodiment differs from the first embodiment only with respect to a point that a leading guidance sign, generated and indicated by the guidance indication unit 43, is not a route guidance sign, but is a selected elevator guidance sign. In the following description, only a point that makes the second embodiment different from the first embodiment will be described, and the description of a configuration substantially equal to the corresponding configuration of the first embodiment will be omitted.

As described above, the selected elevator guidance sign is a sign indicating that the selected vertical transportation machine is selected as the elevator for the target user to take, the selected elevator guidance sign being indicated on the door surface of the selected elevator, a floor surface in front of the landing entrance, or in a space in front of the door. The indication image generation unit 45 of the guidance indication unit 43 generates an image of the selected elevator guidance sign. Specifically, the indication image generation unit 45 acquires information on the indication mode registered in the second database DB2 in association with the identification information for the user, and generates an image of the selected elevator guidance sign adopting such an indication mode. When the generated image is projected, by the projection means 47 or the like, on the door surface of the selected elevator, on the floor surface in front of the landing entrance, or in a space in front of the door, a selected elevator guidance sign is indicated, the selected elevator guidance sign indicating that the selected elevator is selected as the vertical transportation machine for the user to take.

Figure 5:
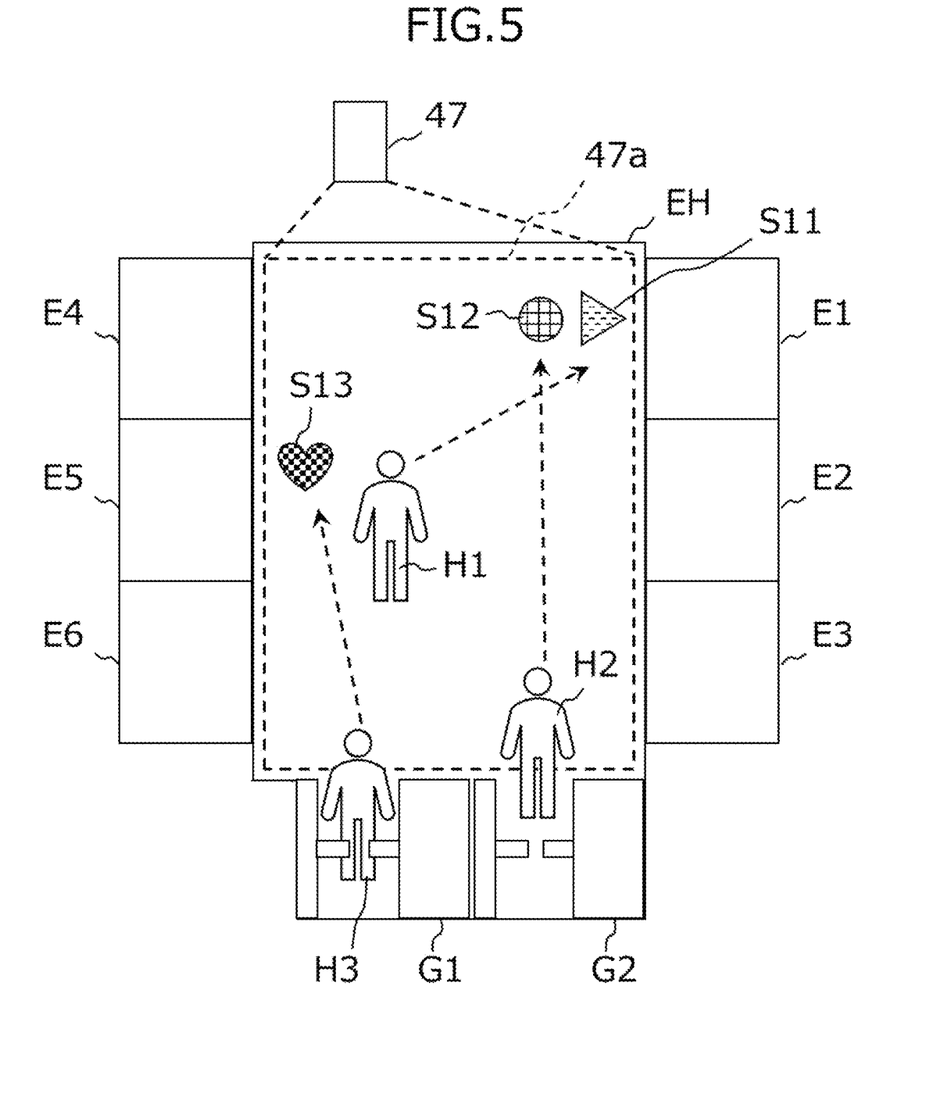
FIG. 5 is a view showing selected elevator guidance signs generated by an elevator guidance device according to a second embodiment.

FIG. 5 is a view showing an example where selected elevator guidance signs S11 to S13 are respectively indicated for the plurality of users H1 to H3 on the floor surface in front of the landing entrances of the respective selected elevators instead of the route guidance signs S1 to S3 in the case shown in FIG. 2. FIG. 5 shows the case where indication modes which differ in shape and pattern are associated with the users H1 to H3. Assume that each of the users H1 to H3 recognizes in advance the indication mode associated with himself/herself. By finding a sign provided for himself/herself from the selected elevator guidance signs S11 to S13 by using the indication mode associated with himself/herself as a key and by heading for the sign, each of the users H1 to H3 can arrive at the selected elevator. For example, in the case of the user H2, by finding the selected elevator guidance sign S12 adopting the indication mode "a round shape with vertical and horizontal stripe pattern" associated with himself/herself from the selected elevator guidance signs S11 to S13 and by heading for the sign, the user H2 can arrive at the selected elevator E1 without getting lost.

Modification of Second Embodiment

Figure 6:
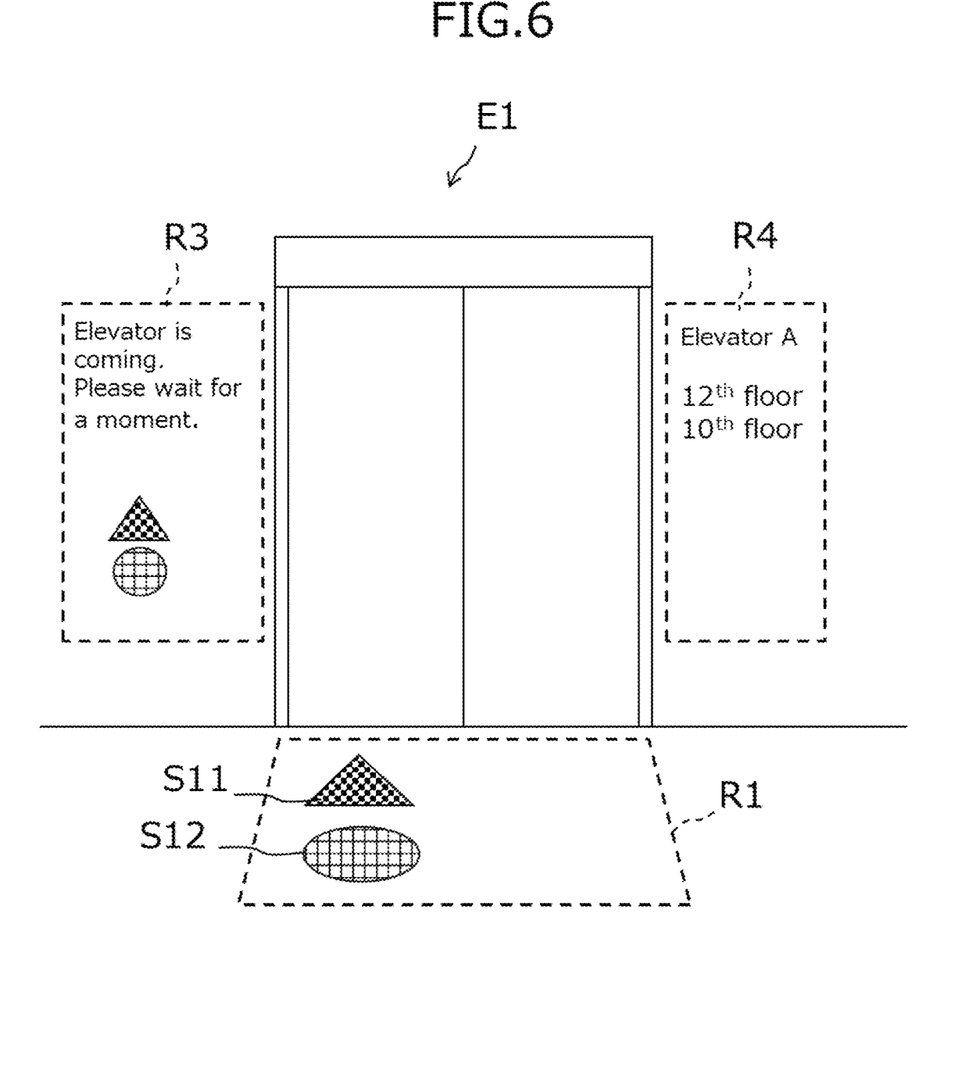
FIG. 6 is a view showing a modification of the second embodiment.

FIG. 6 is a view showing a modification of the second embodiment. FIG. 6 shows an example of various indications on the front side of the elevator E1. In indicating the selected elevator guidance signs S11, S12 on a floor surface area R1 in front of the landing entrance of the elevator according to the second embodiment, the elevator guidance device 40 can indicate various indications in addition to the indication of the selected elevator guidance signs S11, S12 as shown in FIG. 6 by performing a projection on left and right wall surface areas R3, R4 of the door of the elevator E1 by a wall-mounted type monitor or projection means (not shown in the drawing). Examples of various indications include a message to users, an indication relating to target users who take an elevator, Elevator No., or destination floors.

In the above-mentioned respective embodiments, the description has been made for the case where the leading guidance sign is indicated by projection performed by the projection means 47. However, in place of such a technique, a leading guidance sign may be indicated on a liquid crystal indication device, an organic electroluminescence (EL) indication device, a light emitting diode (LED) indication device, or a microelectromechanical system (MEMS) shutter indication device, installed on the floor surface on the route. Alternatively, a leading guidance sign may be virtually indicated on the route by an augmented reality indication device, such as a wearable indication device or a smartphone. Examples of the wearable indication device include a head mount display, a glasses type indication device, or the like.

In the above-mentioned respective embodiments, the guidance indication unit 43 can further indicate a symbol associated with each user at the time of indicating a leading guidance sign. With such a configuration, a leading guidance signs for each user can be distinguished more easily.

In the above-mentioned respective embodiments, the description has been made for the case where the indication control unit 48 completes the indication of the leading guidance sign at the timing when the selected elevator arrives. However, the indication control unit 48 may complete the indication of the leading guidance sign at the timing when the user arrives at the landing entrance of the selected elevator. Specifically, the time after a lapse of an average time period required for a user to move from the security gate G1 (or G2) to the selected elevator from time when the user passes the security gate G1 (or G2) is assumed as the timing when the user arrives at the selected elevator, and the indication can be completed at that timing.

In the above-mentioned respective embodiments, the description has been made for the case where a destination floor is registered in advance for each user. However, for a user having no registration of a destination floor, an operating panel is installed at the entrance and exit of the elevator hall. And the user is caused to input a destination floor through such an operating panel, so that an elevator can be selected based on the inputted information.

In the above-mentioned respective embodiments, the description has been made for the case where the vertical transportation machine is an elevator. However, it is sufficient that the vertical transportation machine be a machine that carries persons or objects between floors of a building, and may be an escalator, for example.

The layout and the number of elevators and security gates shown in the above-mentioned respective embodiments may be suitably changed.

REFERENCE SIGNS LIST 5 processor
6 memory
7 signal input/output unit
20 access management device
21 user authentication unit 30 elevator management device
31 elevator selection unit
32 elevator control unit
40 elevator guidance device
41 identification information acquisition unit
42 selected elevator information acquisition unit
43 guidance indication unit
45 indication image generation unit
47 projection means
48 indication control unit
49 indication mode management unit
DB1 first database
DB2 second database
E1 to E6 elevator
H1, H2, H3 user
S1, S2, S3 route guidance sign
100 elevator management system
47a indication range
G1, G2 security gate
G11, G21 information reading unit
G12, G22 open-close control unit
S11, S12 selected elevator guidance sign

The invention claimed is:

1. A vertical transportation machine guidance device comprising:
a processor
to acquire identification information for a user heading for a vertical transportation machine hall and to identify the user by the identification information;
to acquire information on a selected vertical transportation machine selected from a plurality of vertical transportation machines as a vertical transportation machine for the user identified to take;
to determine if the identified user has authority to access the vertical transportation machine based on the identification information; and
to indicate, in an indication mode, a leading guidance sign on a route starting from a leading start position, at which leading of the user identified is started, to a landing entrance of the selected vertical transportation machine, the leading guidance sign leading the user to the landing entrance of the selected vertical transportation machine,
wherein the leading guidance sign is a route guidance sign indicating the route,
a plurality of indication modes are registered in advance in a database, the database storing each indication mode in association with respective identification information for each of a plurality of users,
among the plurality of indication modes, the indication mode that is associated with the identification information for the identified user is applied for the leading guidance sign only when the identified user is determined to have the authority to access the vertical transportation machine based on the identification information, and
the processor indicates the leading guidance sign on the route by any one of a liquid crystal indication device, an organic electroluminescence indication device, an LED indication device, and a microelectromechanical system shutter indication device, installed on a floor surface on the route.

2. The vertical transportation machine guidance device according to claim 1, wherein
the leading guidance sign is a selected vertical transportation machine guidance sign indicating that the selected vertical transportation machine is selected as a vertical transportation machine for the user to take, the leading guidance sign being indicated on a door surface of the selected vertical transportation machine, on a floor surface in front of the landing entrance, or in a space in front of a door.

3. The vertical transportation machine guidance device according to claim 1, wherein the processor to change the indication mode associated with the identification information for the user upon reception of a change instruction signal that instructs a change of the indication mode associated with the identification information for the user.

4. The vertical transportation machine guidance device according to claim 1, wherein in a case where indication modes associated with the identification information for two or more users identified overlap with each other, the processor indicates the leading guidance sign for at least a portion of the two or more users in an indication mode different from the indication mode overlapping.

5. The vertical transportation machine guidance device according to claim 1, wherein in a case where no indication mode is associated with the identification information for the user identified, the processor indicates the leading guidance sign for the user in an indication mode different from an indication mode in use for indicating the leading guidance sign for another user.

6. The vertical transportation machine guidance device according to claim 1, wherein in a case where no indication mode is associated with the identification information for the user identified, the processor causes the indication mode different from the indication mode in use for indicating the leading guidance sign for another user to be associated with the user.

7. The vertical transportation machine guidance device according to claim 1, wherein the leading guidance sign includes an arrow or footprint, and the indication mode associated with the user defines any one or more of a color of the arrow or the footprint, a pattern displayed on the arrow or the footprint, and a displayed width of the arrow or the footprint.

8. The vertical transportation machine guidance device according to claim 7, wherein the arrow of the leading guidance sign presented according to the indication mode associated with the user is different from another leading guidance sign associated with a different user.

9. The vertical transportation machine guidance device according to claim 1, wherein the processor further indicates a symbol associated with the identification information for the user in indicating the leading guidance sign.

10. The vertical transportation machine guidance device according to claim 1, wherein the processor acquires the identification information for the user acquired at a time of the user passing through a security gate that selectively permits access of the user to a vertical transportation machine hall according to access authority for the user, and
indicates the leading guidance sign by using an exit of the security gate through which the user passes as the leading start position.

11. The vertical transportation machine guidance device according to claim 1, wherein the processor indicates the leading guidance sign by using a current position of the user identified from an image obtained by recording the user as a leading start position.

12. The vertical transportation machine guidance device according to claim 1, wherein the processor projects the leading guidance sign on the route.

13. A vertical transportation machine guidance device comprising:

a processor
- to acquire identification information for a user heading for a vertical transportation machine hall and to identify the user by the identification information;
- to acquire information on a selected vertical transportation machine selected from a plurality of vertical transportation machines as a vertical transportation machine for the user identified to take;
- to determine if the identified user has authority to access the vertical transportation machine based on the identification information; and
- to indicate, in an indication mode, a leading guidance sign on a route starting from a leading start position, at which leading of the user identified is started, to a landing entrance of the selected vertical transportation machine, the leading guidance sign leading the user to the landing entrance of the selected vertical transportation machine, wherein the leading guidance sign is a route guidance sign indicating the route, a plurality of indication modes are registered in advance in a database, the database storing each indication mode in association with respective identification information for each of a plurality of users, among the plurality of indication modes, the indication mode that is associated with the identification information for the identified user is applied for the leading guidance sign only when the identified user is determined to have the authority to access the vertical transportation machine based on the identification information, and the processor virtually indicates the leading guidance sign on the route by an augmented reality indication device.

14. A vertical transportation machine guidance method comprising:

- acquiring identification information for a user heading for a vertical transportation machine hall and identifying the user by the identification information;
- acquiring information on a selected vertical transportation machine selected from a plurality of vertical transportation machines as a vertical transportation machine for the user identified to take,
- determining if the identified user has authority to access the vertical transportation machine based on the identification information, and
- indicating, in an indication mode, a leading guidance sign on a route starting from a leading start position, at which leading of the user identified is started, to a landing entrance of the selected vertical transportation machine, the leading guidance sign leading the user to the landing entrance of the selected vertical transportation machine, wherein the leading guidance sign is a route guidance sign indicating the route, a plurality of indication modes are registered in advance in a database, the database storing each indication mode in association with respective identification information for each of a plurality of users, and among the plurality of indication modes, the indication mode that is associated with the identification information for the identified user is applied for the leading guidance sign only when the identified user is determined to have the authority to access the vertical transportation machine based on the identification information, the method further comprises:

indicating the leading guidance sign on the route by any one of a liquid crystal indication device, an organic electroluminescence indication device, an LED indication device, and a microelectromechanical system shutter indication device, installed on a floor surface on the route.

* * * * *